United States Patent Office 2,742,458
Patented Apr. 17, 1956

2,742,458
PYRAZOLONE AZO-DYESTUFFS INSOLUBLE IN WATER

Gerhard Langbein, Hofheim, Germany, assignor to Farbwerke Hoechst Aktiengesellschaft vormals Meister Lucius und Brüning, Frankfurt am Main-Hoechst, Germany, a company of Germany No Drawing. Application June 2, 1952,
Serial No. 291,285

Claims priority, application Germany June 2, 1951

5 Claims. (Cl. 260—159)

The present invention relates to azo-dyestuffs insoluble in water and to fiber dyed therewith; more particularly, it relates to dyestuffs of the general formula

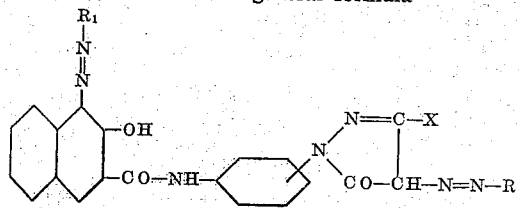

wherein R and $R_1$ represent aromatic radicals free from groups imparting solubility in water, and X represents hydrogen or a substituent not imparting solubility in water.

In the production of azo-dyestuffs on the fiber by the ice-color method arylides of 2,3-hydroxynaphthoic acid are known to be the most important and the most commonly used grounding component. By means of these arylides it is possible to produce nearly all tints ranging from orange to blue by coupling them with diazo-compounds. However, it has not hitherto been possible to produce useful green dyeings with the aid of these arylides. This need has been fulfilled to a certain extent only by the discovery that 2,3-hydroxy-anthracene-carboxylic acid arylides when coupled with the socalled blue bases, yield blue-green dyeings (see German Patent No. 549,983).

Now I have found that on the basis of the 2,3-hydroxynaphthoic acid, new and valuable water-insoluble azo-dyestuffs some of which yield green tints can be obtained by coupling in substance, on the fiber or on a substratum adapted for the production of lakes 2,3-hydroxynaphthoic acid arylides obtainable by condensing 2,3-hydroxynaphthoic acid with amino-azo-dyestuffs of the pyrazolone series, and corresponding to the general formula

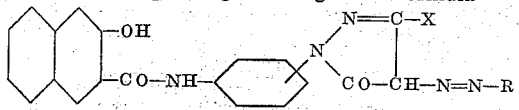

wherein R represents an aromatic radical free from groups imparting solubility in water, and X represents hydrogen or a substituent not imparting solubility in water, with a diazo-compound free from groups imparting solubility in water or with a diazo-azo-compound.

When produced in substance, the new dyestuffs serve for the preparation of valuable pigments. It is especially advantageous to produce the new insoluble dyestuffs on the fiber by dyeing or printing processes suitable for the production of ice colors.

As compared with the corresponding azo-dyestuffs from 2,3-hydroxynaphthoic acid anilide, the tints of the new dyestuffs are generally displaced towards yellow. For example, bases which produce scarlet tints with the 2,3-hydroxynaphthoic acid aniline yield orange tints with arylides used in the present invention; red bases yield scarlet tints; current and violet bases yield brown tints; and the ordinary commercial blue bases yield currant, grey-blue to olive tints. Many of these dyeings possess very good fastness to light and properties of wet fastness.

Of special interest are the coupling products of these new 2,3-hydroxynaphthoic acid arylides with the diazo-azo-compounds of amines, for example, those of the general formula

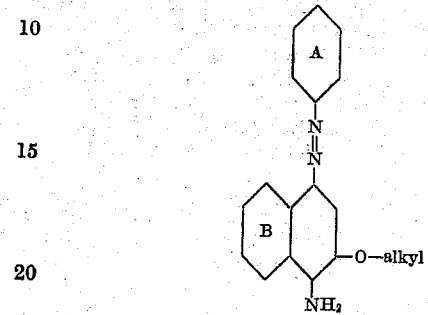

wherein the nuclei A and B may contain substituents, because valuable green dyeings can be produced with these dyestuffs. In numerous cases much more yellowish green tints are produced than in the case of the most greenish dyestuff hitherto used in practice from 2,3-hydroxyanthracene carboxylic acid-ortho-toluidide and diazotised 3-methoxy-4-aminodiphenylamine, which yields blue-green tints. As regards fastness to light the new dyestuffs are not inferior to the hitherto known dyestuffs, and they possess very good properties of wet fastness.

There may also be used as diazo-components diazo-azo-compounds of the above formula in which the nucleus B contains a sulfonic acid group. The green dyeings produced with the resulting dyestuffs have good properties of wet fastness notwithstanding the presence of the sulfonic acid group. In some cases the dyestuffs containing sulfonic acid groups are even somewhat clearer and have a better fastness to chlorine than the dyestuffs which are free from sulfonic acid groups and the known green dyestuffs obtainable by using 2,3-hydroxyanthracene carboxylic acid arylides.

In view of the large number of possible coupling combinations the new dyestuffs constitute a valuable enrichment of the class of pigment dyes and ice colors, especially among green water-insoluble azo-dyestuffs.

The 2,3-hydroxynaphthoic acid arylides of the above general formula used as coupling components can be obtained by condensing 2,3-hydroxynaphthoic acid or a functional acid derivative thereof with an amino-azo-dyestuff of the pyrazolone series corresponding to the following general composition

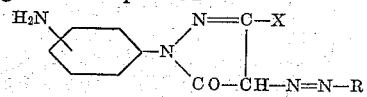

wherein R represents an aromatic radical which does not contain any group lending solubility in water and X represents hydrogen or a substituent not imparting solubility in water.

The following examples serve to illustrate the invention, the parts being by weight:

EXAMPLE 1

52.8 parts of the 2.3-hydroxynaphthoic acid arylide of the formula

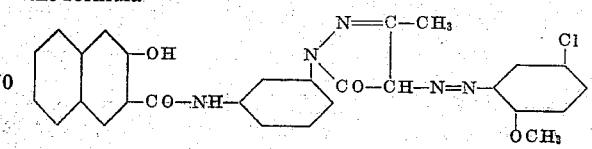

(obtainable by condensing 2,3-hydroxynaphthoic acid with 1-(3'-aminophenyl) - 3 - methyl-4-(2''-methoxy-5''-chlorobenzene-1''-azo)-5-pyrazolone are stirred with 150 parts of alcohol and 40 parts of sodium hydroxide solution of 38° Bé. until dissolution occurs. The mixture is then poured into 1000 parts of water and the arylide is precipitated from the clear dark yellow solution by acidifying with dilute acetic acid. 250 parts of a very weakly acid solution of 4-nitrobenzene-1-diazonium chloride, corresponding to 13.8 parts of 1-amino-4-nitrobenzene, are then run at room temperature in the course of a few minutes into the suspension, while stirring. Stirring is continued for 10 minutes, the mixture is filtered with suction, and the residue is washed with water until a neutral reaction is attained. The dyestuff so obtained is a scarlet pigment and has a good fastness to light.

A green pigment dyestuff is obtained by using, instead of the 4-nitrobenzene-1-diazonium chloride, the diazo-compound from 1-amino-4-(2'-methoxy-5'-nitrobenzene-1'-azo)-2-ethoxy-naphthalene, and preferably working with the addition of a small quantity of pyridine.

EXAMPLE 2

1 part of the arylide obtainable from 2,3-hydroxynaphthoic acid and 1-(3'-aminophenyl)-3-methyl-4-(2''-methyl-4''-chloro-benzene-1''azo)-5-pyrazolone, and corresponding to the formula

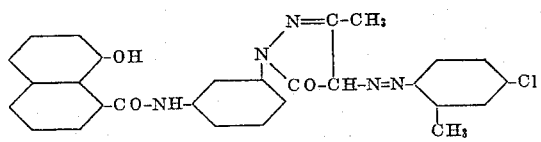

is stirred, while gently heating, with 3 parts of alcohol, 3 parts of water and 0.6 part of sodium hydroxide solution of 38° Bé. until dissolution is complete and then poured into a mixture of 983 parts of water, 7 parts of sodium hydroxide solution of 38° Bé. and 10 parts of Turkey red oil. A clear yellow solution is obtained. 50 parts of cotton yarn are introduced into the bath thus produced and treated therein for ½ hour at 30° C.–35° C., while frequently working the yarn in the bath. After squeezing and centrifuging the yarn, it is placed in a bath containing in 1000 parts of water, 4 parts of a dyeing salt consisting of 33 per cent of the diazonium chloride of 1-amino-4-(2',4'-dimethoxy-5'-nitro-benzene-1'-azo)-2-ethoxynaphthalene in addition to aluminium sulphate and sodium sulphate. The dyeing is developed for 15–20 minutes at 30° C. After being rinsed the material is soaped twice at the boil for 10 minutes on each occasion with a solution which contains in 1000 parts 50 parts of a soap solution of 1:20 strength and 4 parts of a sodium hydroxide solution of 38° Bé.

An intense, clear green dyeing is obtained which has very good properties of wet fastness and a good fastness to light.

By carrying out the development with the same molecular proportion of diazotised 1-amino-4-(2'-methyl-5'-nitrobenzene-1'-azo) - 2 - ethoxynaphthalene-6-sulphonic acid in a bath rendered feebly alkaline, for example, by the addition of a little pyridine, a similar, somewhat clearer and more bluish-green tint is produced which likewise possesses good properties of wet fastness but has a better fastness to chlorine than the dyeing previously described.

With other diazotised amines and other 2,3-hydroxynaphthoic acid arylides of the above constitution dyestuffs are obtained having similarly good properties of wet fastness and a good to very good fastness to light.

In the following table are given a number of other water-insoluble azo-dyestuffs of this invention:

Table

| Diazo component | Coupling component | Tint |
|---|---|---|
| (1) 1-amino-2,5-dichlorobenzene. | Condensation product from 2,3-hydroxynaphthoic acid and 1-(3'-aminophenyl)-3-methyl-4-(2''-methyl-4''-chlorobenzene-1''-azo)-5-pyrazolone. | scarlet. |
| (2) 1-aminoanthraquinone. | do | Do. |
| (3) 1-amino-2-methoxy-4-benzoylamino-5-methyl-benzene. | do | currant. |
| (4) 4-amino-3-methoxy-diphenylamine. | do | grey-blue. |
| (5) 1-amino-2-(4'-nitro-2'-chlorobenzene-1'-azo)-5-methoxy-4-methybenzene. | do | brown. |
| (6) 1-amino-4-(2'-chloro-5'-nitrobenzene - 1' - azo) - 2 - ethoxynaphthalene-6-sulphonic acid. | do | clear green. |
| (7) 1-amino-4-(2'-methyl-5'-nitrobenzene - 1' - azo) - 7 - methoxynaphthalene. | do | olive green. |
| (8) 1-amino-2,5-dichlorobenzene. | Condensation product from 2,3-hydroxynaphthoic acid and 1-(3'-aminophenyl)-3-methyl-4-(3''-chlorobenzene-1''-azo)-5-pyrazolone. | orange. |
| (9) 1-amino-4-chloro-4-methyl-benzene. | do | scarlet. |
| (10) 1-amino-4-nitro-2-methoxybenzene. | do | red. |
| (11) 1-amino-4-benzoyl-amino-2,5-diethoxy-benzene. | do | violet-grey. |
| (12) 4-amino-3-methoxy-diphenylamine. | do | grey-blue. |
| (13) 1-amino-4-(4'-nitrobenzene-1'-azo)-2,5-dimethoxybenzene. | do | black in a thick dyeing. |
| (14) 1-amino-4-(2',5'-dichlorobenzene-1'-azo)-2-methoxy-naphthalene-6-sulphonic acid. | do | blue-green. |
| (15) 1-amino-4-(2'-methoxy-5'-nitrobenzene-1'-azo)-2-ethoxynaphthalene. | do | Do. |
| (16) 1-amino-4-(2'-methyl-5'-nitrobenzene - 1' -azo) - 2 - ethoxynaphthalene-6-sulphonic acid. | Condensation product from 2,3-hydroxynaphthoic acid and 1-(3'-aminophenyl)-3-methyl-4 - (2'' - methoxy - 5'' - chlorobenzene-1''-azo) - 5-pyrazolone. | clear green. |
| (17) 1-amino-4-(2',4'-dimethoxy-5'-nitrobenzene-1'-azo)-2-ethoxynaphthalene. | do | green. |
| (18) 1-amino-2-(4'-nitro-2'-chlorobenzene-1'-azo)-5-methoxy - 4 - methylbenzene. | do | brown. |
| (19) 1-amino-4-(2'-methoxy-5'-nitrobenzene-1'-azo)-2-methoxynaphthalene - 6 - sulphonic acid. | Condensation product from 2,3-hydroxynaphthoic acid and 1-(4'-aminophenyl)-3-methyl-4-(3'' - chlorobenzene -1'' - azo)-5-pyrazolone. | dark green. |
| (20) 1-amino-2,5-dichlorobenzene. | do | scarlet. |
| (21) 4-aminodiphenylamine. | Condensation product from 2,3-hydroxynaphthoic acid and 1-(3'-aminophenyl)-3-methyl-4-(2''-trifluoromethyl-4''-chlorobenzene-1''-azo) - 5-pyrazolone. | dark olive. |
| (22) 1-amino-4-(2'-methyl-5'-nitrobenzene-1'-azo)-2-ethoxynaphthalene-6-sulphonic acid. | do | blue-green. |
| (23) 1-amino-4-(2'-methyl-5'-nitrobenzene-1'-azo)-2-ethoxynaphthalene-6-sul- | Condensation product from 2,3-hydroxynaphthoic acid and 1-(3'-aminophenyl)-3-methyl-4-(naphthalene-1''-azo)-5-pyrazolone. | dark-green. |
| (24) 1-amino-4-(2'-methyl-5'-nitrobenzene-1'-azo)-2-ethoxynaphthalene-6-sulphonic acid. | Condensation product from 2,3-hydroxynaphthoic acid and 1-(3'-aminophenyl)-3-carbethoxy-4-(2''-methyl-4''-chlorobenzene-1''-azo)-5-pyrazolone. | grey-blue. |
| (25) 1-amino-4-(2'-methoxy-5'-nitrobenzene-1'-azo)-2-ethoxynaphthalene. | do | grey-green. |

I claim:
1. The water-insoluble azo-dyestuffs corresponding to the following general formula:

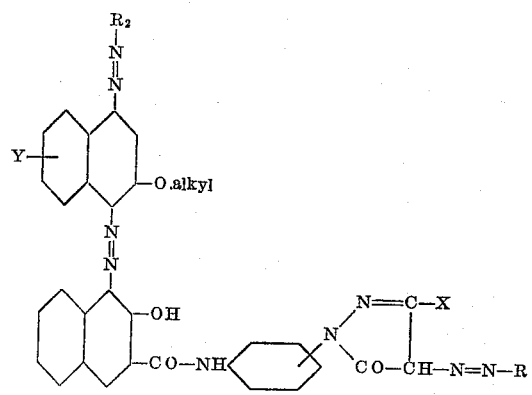

wherein R and R₂ stand for members of the group consisting of radicals of the benzene and naphthalene series free from sulfonic and carboxylic acid groups, X stands for a member of the group consisting of methyl and carbethoxy, and Y stands for a member of the group consisting of hydrogen and the sulfonic acid group.

2. The water-insoluble azo-dyestuffs corresponding to the following general formula

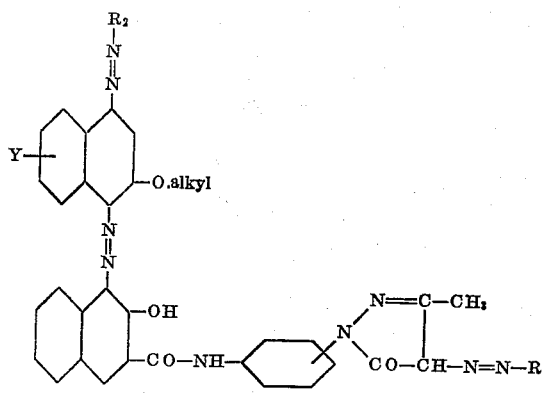

wherein R and R₂ stand for radicals of the benzene series free from sulfonic and carboxylic acid groups and Y stands for a member of the group consisting of hydrogen and the sulfonic acid group.

3. The water-insoluble azo-dyestuff corresponding to the following formula

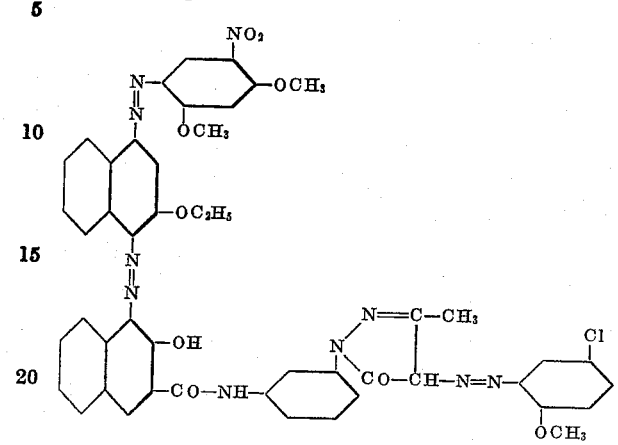

4. The water-insoluble azo-dyestuff corresponding to the following formula

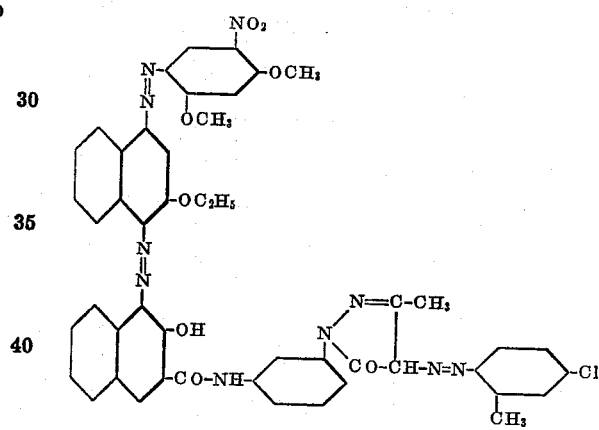

5. The water-insoluble azo-dyestuff corresponding to the following formula

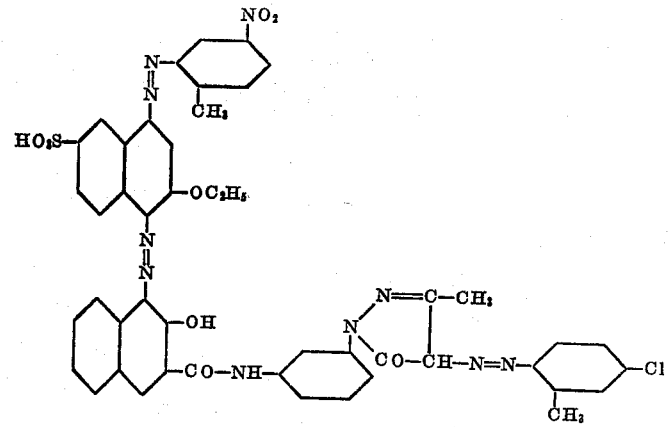

References Cited in the file of this patent
UNITED STATES PATENTS

| | | |
|---|---|---|
| 2,006,740 | Krzikalla et al. | July 2, 1934 |
| 2,087,706 | Sexton | July 20, 1937 |